(12) United States Patent
Zhang et al.

(10) Patent No.: US 12,432,179 B2
(45) Date of Patent: Sep. 30, 2025

(54) VIRTUAL FIREWALL CONSTRUCTION METHOD BASED ON OPENSTACK FRAMEWORK

(71) Applicant: INSPUR SUZHOU INTELLIGENT TECHNOLOGY CO., LTD., Jiangsu (CN)

(72) Inventors: Tongjian Zhang, Jiangsu (CN); Haizhong Qin, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 194 days.

(21) Appl. No.: 18/029,072

(22) PCT Filed: Jul. 29, 2021

(86) PCT No.: PCT/CN2021/109224
§ 371 (c)(1),
(2) Date: Mar. 28, 2023

(87) PCT Pub. No.: WO2022/083207
PCT Pub. Date: Apr. 28, 2022

(65) Prior Publication Data
US 2023/0379303 A1    Nov. 23, 2023

(30) Foreign Application Priority Data
Oct. 20, 2020 (CN) .......................... 202011125136.7

(51) Int. Cl.
*H04L 9/40* (2022.01)
*H04L 45/00* (2022.01)
*H04L 45/586* (2022.01)

(52) U.S. Cl.
CPC ........ *H04L 63/0263* (2013.01); *H04L 45/566* (2013.01); *H04L 45/586* (2013.01)

(58) Field of Classification Search
CPC ..... H04L 45/566; H04L 45/586; H04L 63/02; H04L 63/0263
See application file for complete search history.

(56) References Cited

U.S. PATENT DOCUMENTS 9,130,901 B2 * 9/2015 Lee ...................... H04L 63/1441
9,215,214 B2 * 12/2015 Bansal ................ H04L 63/0245
(Continued)

FOREIGN PATENT DOCUMENTS

| CN | 103763310 A | 4/2014 |
| CN | 107196952 A | 9/2017 |

(Continued)

OTHER PUBLICATIONS

PCT/CN2021/109224 international search report.

*Primary Examiner* — Linglan Edwards
(74) *Attorney, Agent, or Firm* — IPro, PLLC

(57) ABSTRACT

A virtual firewall construction method based on an OpenStack framework, and a storage medium. The method includes: modifying a firewall rule of a target data packet service according to a preset rule, and obtaining a modified target data packet service, the modified target data packet service utilizes the modified firewall rule to perform data packet control, and a forwarding stack is provided in the modified target data packet service, a forwarding performance of the forwarding stack is higher than the forwarding performance of a routing service of the OpenStack framework; a firewall configuration interface is provided in the firewall rule of the modified target data packet service, and the firewall configuration interface is configured to, according to different users under different virtual networks, set a data packet processing rule meeting requirements of the users; and replacing the routing service of the OpenStack framework according to the modified target packet service.

14 Claims, 2 Drawing Sheets

(56) References Cited

U.S. PATENT DOCUMENTS

| | | | |
|---|---|---|---|
| 10,257,089 B2* | 4/2019 | Bays | H04L 45/74 |
| 10,484,334 B1* | 11/2019 | Lee | H04L 67/30 |
| 11,252,040 B2* | 2/2022 | Boon | H04L 63/0227 |
| 11,336,572 B2* | 5/2022 | Boutros | G06F 9/44 |
| 11,336,696 B2* | 5/2022 | Karasaridis | H04L 63/20 |
| 2019/0028347 A1* | 1/2019 | Johnston | H04L 43/20 |
| 2019/0207853 A1* | 7/2019 | Ferriter | G06F 16/137 |
| 2019/0394081 A1* | 12/2019 | Tahhan | H04L 41/122 |

FOREIGN PATENT DOCUMENTS

| | | |
|---|---|---|
| CN | 112491789 A | 3/2021 |
| EP | 1389377 A2 | 2/2004 |

\* cited by examiner

VIRTUAL FIREWALL CONSTRUCTION METHOD BASED ON OPENSTACK FRAMEWORK

CROSS-REFERENCE TO RELATED APPLICATIONS

The present disclosure claims the benefit of priority to Chinese patent application No. 202011125136.7 filed on Oct. 20, 2020 before the CNIPA, China National Intellectual Property Administration, and titled "METHOD FOR CONSTRUCTING VIRTUAL FIREWALL BASED ON OPENSTACK FRAMEWORK AND STORAGE MEDIUM", which is incorporated herein by reference in its entirety.

TECHNICAL FIELD

The present disclosure relates to the technical field of firewalls, in particular to a method for constructing a virtual firewall based on OpenStack framework and a storage medium.

BACKGROUND

The rapid development of cloud computing services is accompanied by increasing popularity of cloud computing platforms based on the OpenStack framework. OpenStack is originally an open-source cloud computing management platform project and is a combination of a series of software open-source projects. OpenStack renders scalable and elastic cloud computing services for private clouds and public clouds by providing an operating platform or toolset for deploying clouds, and functions as the main framework for node control in the process of building clouds. Moreover, the boundary of data is gradually diminishing due to cloud computing. Cloud computing faces more threats and a greater range of attacks, and security issues have become a bottleneck restricting the development of cloud computing. Once malicious network attack traffic enters a virtual cloud platform, a fatal network breakdown will occur, and for this reason, people are getting even more dependent on virtual firewalls.

At present, in a scenario of deploying a private cloud platform based on the OpenStack framework, the applicable virtual firewall technology generally includes two methods, where the first is to add a data packet rule table in a native routing service based on OpenStack, so that the input and output virtual network data packets are controlled through the rules in the data packet rule table, and the second is to introduce a Vector Packet Processing (VPP) service to replace the packet processing mechanism of OpenStack. The Vector Packet Processing (VPP) is a vector data packet processing tool provided by Cisco, and in the Vector Packet Processing (VPP) service, a data packet processing rule (i.e., an access control rule) is provided; in this way, the Vector Packet Processing (VPP) service realizes the control of data packets in the virtual network. However, in practical applications, the first method has a good processing effect, but a forwarding process will be limited by the bandwidth of the virtual routing when the native routing service of the OpenStack framework performs packet control based on the packet rule table, resulting in a bottleneck restriction, and affecting the forwarding efficiency in the process of controlling data packets. As to the counterpart second method, the Vector Packet Processing (VPP) service is used to solve the problem of forwarding efficiency, but its existing data packet processing rules (i.e., the access control rule) are the same in one network. When two different virtual machines are built by different users in one network, different data packet processing rules are not available, failing to meet the needs of different users for different processing rules. Therefore, forwarding efficiency and differentiated settings are not compatible in the existing virtual firewall based on the OpenStack framework.

SUMMARY

It is an object of the present disclosure to provide a method for constructing a virtual firewall based on OpenStack framework and a computer-readable storage medium.

A first aspect of the present disclosure provides a method for constructing a virtual firewall based on OpenStack framework, including:
modifying a firewall rule of a target data packet service according to a preset rule, and obtaining a modified target data packet service, the modified target data packet service utilizes the modified firewall rule to perform data packet control, and a forwarding stack is provided in the modified target data packet service, wherein a forwarding performance of the forwarding stack is higher than the forwarding performance of a routing service of the OpenStack framework; a firewall configuration interface is provided in the firewall rule of the modified target data packet service, and the firewall configuration interface is configured to, according to different users under different virtual networks, set a data packet processing rule meeting requirements of the users; and
replacing the routing service of the OpenStack framework according to the modified target packet service.

In some embodiments, the target packet service is a vector packet processing (VPP) service; a forwarding stack constructed based on a data plane development kit (DPDK) is provided in a modified Vector Packet Processing (VPP) service.

In some embodiments, the modifying a firewall rule of a target data packet service according to a preset rule further includes:
modifying implementation codes of a virtual router in the vector packet processing (VPP) service to obtain a modified virtual machine, and creating a virtual routing forwarding index for the modified virtual machine;
modifying process codes of an issuing rule of data packet control in the vector packet processing (VPP) service, and bonding the modified issuing rule with the virtual routing forwarding index; and
setting the firewall configuration interface of the vector packet processing (VPP) service, for bonding a corresponding virtual routing forwarding index, and the firewall configuration interface is configured to configure the firewall rule for each virtual routing forwarding index, and the firewall configuration interface includes determination conditions and processing methods in processing data packets.

In some embodiments, the determination conditions include determination parameters and a parameter determination rule, and the determination parameters include a protocol information, a port information, and an address information, and the parameter determination rule is determined according to an operation command input by a user through the firewall configuration interface.

In some embodiments, the processing methods include performing forwarding and ignoring a forwarding request.

In some embodiments, after replacing the routing service of the OpenStack framework according to the modified target packet service, the method further includes:

activating the modified target data packet service in response to detecting a layer 3 forwarding request, to perform access control on a data packet corresponding to the layer 3 forwarding request.

In some embodiments, the activating the modified target data packet service in response to detecting a layer 3 forwarding request, to perform access control on a data packet corresponding to the layer 3 forwarding request includes:

determining an access target corresponding to the layer 3 forwarding request according to the modified target data packet service;

determining the firewall rule according to the virtual routing forwarding index corresponding to the access target;

determining whether the data packet corresponding to the layer 3 forwarding request should be forwarded according to the firewall rule;

forwarding the data packet corresponding to the layer 3 forwarding request to the access target in response to determining that the data packet should be forwarded; and ignoring the data packet corresponding to the layer 3 forwarding request in response to determining that the data packet should not be forwarded.

A second aspect of the present disclosure further provides a computer-readable storage medium. The computer-readable storage medium stores computer-executable instructions, and the computer-executable instructions, when invoked and executed by a processor, enable the processor to execute the method described above.

BRIEF DESCRIPTION OF THE DRAWINGS

To illustrate the embodiments of the present disclosure or the technical solutions in the related art more clearly, a brief description of the accompanying drawings that are necessary in the embodiments or description of the related art is provided below. Apparently, the accompanying drawings in the following description show some embodiments of the present disclosure, and those skilled in the art may devise other drawings based on these drawings without creative efforts.

DETAILED DESCRIPTION OF THE EMBODIMENTS

To illustrate the object, technical solution, and advantages of the embodiments of the present disclosure more clearly, the technical solution of the present disclosure will be clearly and completely described below in conjunction with the accompanying drawings. Apparently, the embodiments described are only some and not all of the embodiments of the present disclosure. All other embodiments obtained by those skilled in the art based on the embodiments of the present disclosure without creative efforts shall fall within the scope of the present disclosure.

The terms "comprise" and "have" mentioned in the embodiments of the present disclosure and any variations thereof are intended to indicate a non-exclusive inclusion. For example, a process, method, system, product or device including a series of steps or units is not limited to the listed steps or units, but optionally also includes other unlisted steps or units, or optionally also includes other steps or elements inherent to the process, method, product or device.

Figure 1:
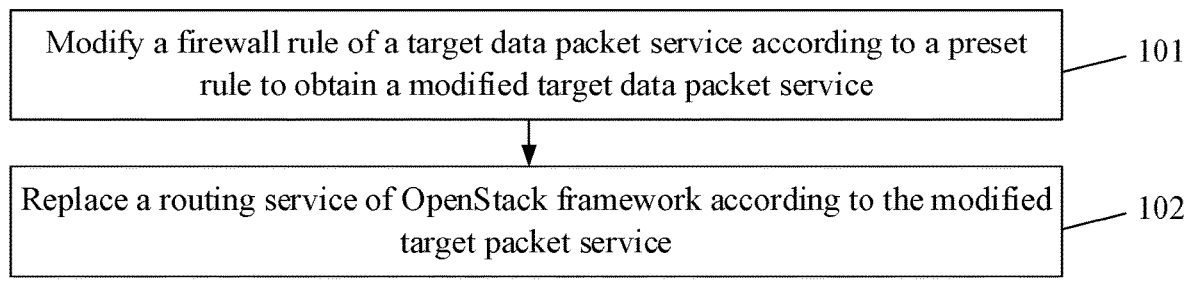
FIG. 1 is a flowchart of a method for constructing a virtual firewall based on OpenStack framework provided by an embodiment of the present disclosure.

As shown in FIG. 1, a method for constructing a virtual firewall based on OpenStack framework provided by an embodiment of the present disclosure includes steps described below.

At step 101, a firewall rule of a target data packet service is modified according to a preset rule, and a modified target data packet service is obtained.

At step 102, routing service of the OpenStack framework is replaced according to the modified target packet service.

Herein, in the above steps, the modified target data packet service performs data packet control through the modified firewall rule, and the modified target data packet service is provided with a forwarding stack whose forwarding performance is higher than that of the routing service of the OpenStack framework. In addition, the firewall rule in the modified target data packet service is provided with a firewall configuration interface, and the firewall configuration interface is configured to set a data packet processing rule that meets the differentiated needs of different users in different virtual networks.

By replacing the original routing service under the OpenStack framework with the modified target service with higher forwarding performance, the problem that the forwarding performance of the original routing service is affected by the bandwidth may be certainly solved in the process of using the virtual firewall to control data packets, and the forwarding stack renders a higher forwarding efficiency. Moreover, in the modified target service, different data packet control rules may be set for different virtual machines in the configuration interface for different users, which meets the differentiated needs of different users to set different data packet control rules.

In an embodiment, the target data packet service is a Vector Packet Processing (VPP) service; the modified Vector Packet Processing (VPP) service is provided with a forwarding stack constructed based on a Data Plane Development Kit (DPDK).

Figure 2:
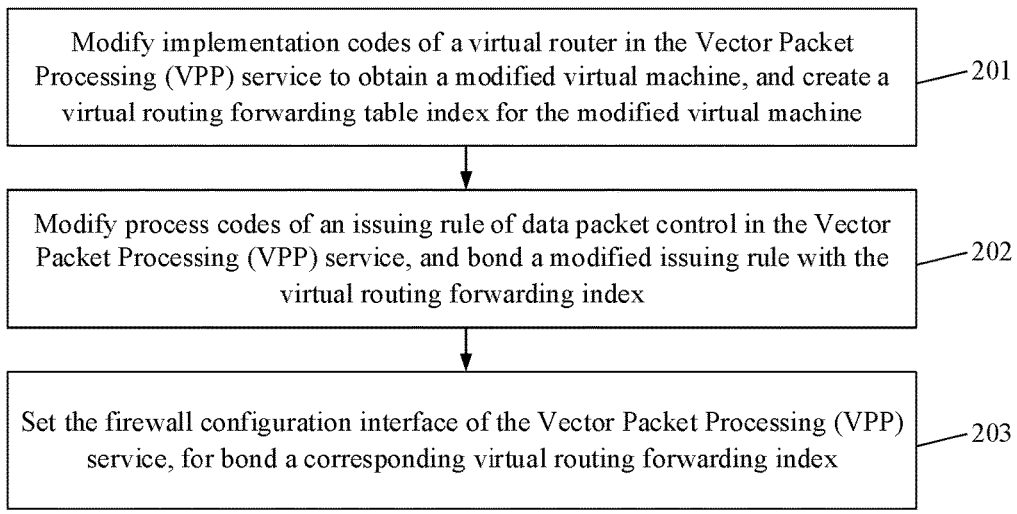
FIG. 2 is a flowchart of specific steps of the method for constructing a virtual firewall based on OpenStack framework provided by an embodiment of the present disclosure.

In an embodiment, as shown in FIG. 2, step 101 of the foregoing embodiment, in which the firewall rule of the target data packet service is modified according to a preset rule, when performed, includes steps described below.

At step 201, implementation codes of a virtual router in the Vector Packet Processing (VPP) service is modified to obtain a modified virtual machine, and a virtual routing forwarding index is created for the modified virtual machine.

At step 202, process codes of an issuing rule of data packet control in the Vector Packet Processing (VPP) service are modified, and the modified issuing rule is bonded with the virtual routing forwarding index.

At step 203, the firewall configuration interface of the Vector Packet Processing (VPP) service is set for bonding a corresponding virtual routing forwarding index.

Herein, the firewall configuration interface is configured to configure the firewall rule for each virtual routing forwarding index, and the firewall configuration interface includes determination conditions and processing methods in processing data packets.

As such, by modifying the implementation code of the router in the Vector Packet Processing (VPP) service, it is certain that different virtual machines (i.e., modified virtual machines) are created in the original Vector Packet Processing (VPP) service, and each virtual machine is bonded with the modified issuing rule through the index, which ensures that when a user later configures a firewall rule that meets his/her own needs using the firewall rule configuration interface, a corresponding virtual machine may be identified, and in the subsequent data packet control, the issuing rule is taken to call the corresponding firewall rule, so that each user may set the corresponding virtual machine and corresponding firewall rule catering to their own needs.

In an embodiment, the determination conditions include determination parameters and a parameter determination rule. The determination parameters include a protocol information, a port information, and an address information, and the parameter determination rule is determined according to an operation command input by a user through the firewall configuration interface.

It should be noted that in the process of setting, the user may select any one or more of the above determination parameters. For example, if only the port information is selected, the port of the data packet may be detected during the subsequent process of controlling the data packet by the virtual firewall to determine whether the parameter determination rule set by the user is met.

In an embodiment, the processing methods include performing forwarding and ignoring a forwarding request. In this way, by setting different processing methods, it is certain that the firewall controls and processes the data packet according to the processing methods, so as to avoid the consequence caused by asking the user when there is a problem.

In an embodiment, after constructing the virtual firewall based on the OpenStack framework in the manner described in the above steps, accessing data packets across networks may also be controlled through the virtual firewall based on the OpenStack framework, that is, when detecting that the firewall is needed to perform the packet control, the following steps are required.

The modified target data packet service is activated in response to detecting a layer 3 forwarding request, to perform access control on a data packet corresponding to the layer 3 forwarding request.

Herein, the layer 3 forwarding is the data interaction between different nodes across the networks, and in the process of controlling the data packet in the networks by the firewall, the focus of prevention lies also in the data interaction between the nodes across the networks. Therefore, when data packets across networks (including across virtual networks) are detected, the access control mechanism of the firewall is triggered. At this time, the modified target data packet service (that is, the virtual firewall function) may be started, and the previously set firewall rule is taken to perform access control on the data packets.

Figure 3:
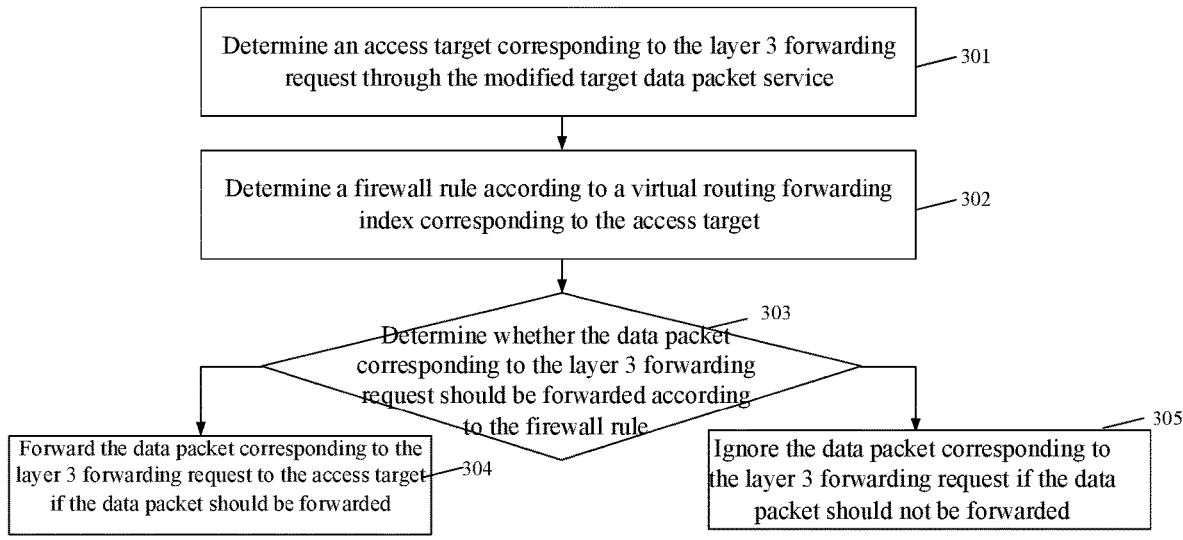
FIG. 3 is a flowchart of data packet control based on a virtual firewall in the method for constructing a virtual firewall based on OpenStack framework provided by an embodiment of the present disclosure.

In an embodiment, when the layer 3 forwarding request is detected, the modified target data packet service is activated to perform access control on the data packet corresponding to the layer 3 forwarding request, and the execution may be as shown in FIG. 3, including steps described below.

At step 301, an access target corresponding to the layer 3 forwarding request is determined according to the modified target data packet service.

At step 302, a firewall rule is determined according to a virtual routing forwarding index corresponding to the access target.

At step 303, it is determined whether the data packet corresponding to the layer 3 forwarding request should be forwarded according to the firewall rule, according to different determination results, step 304 or 305 is performed in the following process.

At step 304, the data packet corresponding to the layer 3 forwarding request is forwarded to the access target if the data packet should be forwarded.

AT step 305, the data packet corresponding to the layer 3 forwarding request IS ignored if the data packet should not be forwarded.

According to the access target, the virtual router corresponding to the target is determined, as a result, the corresponding firewall control function may be triggered, on the basis of the firewall rule bound based on the virtual routing forwarding index by the virtual router and the issuing rule, so as to determine whether the data packet corresponding to the present layer 3 forwarding request is to be forwarded, which realizes the function of controlling the data packet accessed by nodes of different networks for different users in the networks constructed by different virtual routers, and enables the detection function of the firewall.

In addition, after the virtual firewall based on the OpenStack framework is constructed through the aforementioned method, the particular implementation of using the modified Vector Packet Processing (VPP) service to perform packet control may be shown in the following example.

1. According to the needs of users, two virtual machine networks may be created respectively, such as Net1 192.168.10.1/24 and Net2 192.168.20.1/24;

2. After the networks are successfully created, the user may create network virtual machines VM1 and VM2 corresponding to the two networks created above respectively, and creates corresponding indexes;

3. A virtual router is created and connected to the above network;

4. According to the needs of the users, the firewall rules are set as required by the users in the firewall configuration interface; the determination parameters may include protocol information, port information, address information (may be an IP address), and the processing methods include forwarding and discarding;

5. On the router interface, users may select the required firewall rules from the created firewall security policy rules and bond them to the index of their own virtual machines;

6. When there is an access operation from the virtual machine VM1 to the virtual machine VM2, the virtual firewall of the OpenStack framework detects the data packet corresponding to the layer 3 forwarding request; at this time, the virtual firewall of the OpenStack framework activates the modified VPP service; the access target of the data packet is detected to be VM2; the firewall rule of VM2 issued according to the issuing rule corresponding to the index is obtained; the determination parameters, such as the Internet Protocol (IP) address information, port information, and protocol information, of the data packet, are extracted according to the rule and matched with the firewall rule issued;

7. If it is determined that forwarding is allowed according to the firewall rule, the data packet corresponding to the layer 3 forwarding request is directly forwarded to VM2;

otherwise, if it is determined that forwarding is not allowed according to the firewall rule, then the data packet corresponding to the layer 3 forwarding request is discarded.

Figure 4:
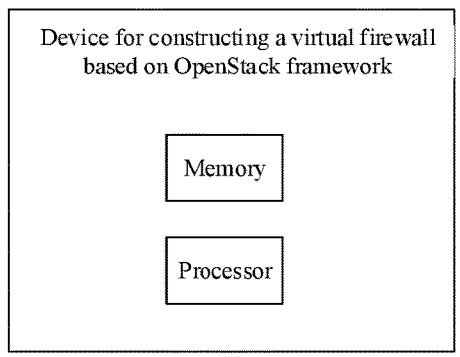
FIG. 4 is a schematic diagram illustrating a device for constructing a virtual firewall based on OpenStack framework provided by an embodiment of the present disclosure.

The present application further provides a device for constructing a virtual firewall based on OpenStack framework. Referring to FIG. 4, the device includes a memory and a processor. The memory is configured to store a computer program. The processor is configured to, when executing the computer program, implement the method for constructing a virtual firewall based on OpenStack framework described above.

Corresponding to the above method, an embodiment of the present disclosure further provides a computer-readable storage medium. The computer-readable storage medium stores machine-executable instructions, and when the computer-executable instructions are invoked and executed by a processor, the computer-executable instructions cause the processor to perform the steps of the above-mentioned method.

According to the method for constructing a virtual firewall based on OpenStack framework and the storage medium provided by the embodiments of the present disclosure, the firewall rule of the target data packet service is modified according to a preset rule to obtain a modified target data packet service, and the routing service of the OpenStack framework is replaced according to the modified target packet service, thereby realizing the construction of a virtual firewall based on the OpenStack framework. The modified target data packet service enables data packet control through the modified firewall rule, and in the modified target data packet service, a forwarding stack with forwarding performance higher than that of the routing service of the OpenStack framework is provided, hence it may be ensured that the virtual firewall after replacing the routing service of the OpenStack framework has a higher efficiency than that of the OpenStack framework in the process of packet control. Moreover, the firewall rule in the modified target data packet service is provided with a firewall configuration interface, and the firewall configuration interface is configured to set data packet processing rules that meet the differentiated needs of different users in different virtual networks. Such a method ensures that the modified service may set different data packet control rules for different virtual machines through the configuration interface for different users in the subsequent data packet control process, which meets the differentiated needs of the users for different data packet control rules. As a result, the compatibility between forwarding efficiency and differentiated settings is achieved in the virtual firewall that is constructed based on the OpenStack framework.

According to the embodiments provided by the present disclosure, it should be understood that the device and method provide can also be implemented in other ways. The device embodiments described above are only illustrative. For example, the flowcharts and block diagrams in the accompanying drawings show the architecture, functions and operations of possible implementations of devices, methods and computer program products according to embodiments of the present disclosure. In this regard, each block in a flowchart or block diagram may represent a module, program segment, or part of codes that includes one or more executable instructions for implementing a specified logical function. It should also be noted that, in some alternative implementations, the functions noted in the block may be performed in an order other than that in the figures. For example, two blocks in succession may, in fact, be executed substantially concurrently, or they may sometimes be executed in the reverse order, depending upon the functionality involved. It should also be noted that each block of the block diagrams and/or flowchart illustrations, and combinations of blocks in the block diagrams and/or flowchart illustrations, can be implemented by a dedicated hardware-based system that performs the specified function or action, or may be implemented by a combination of dedicated hardware and computer instructions.

For another example, the division of the units is only a logical function division, and there may be other division methods in actual implementation. For another example, multiple units or components can be combined or integrated into another system, or some features can be ignored, or not be executed. In another point, the mutual coupling or direct coupling or communication connection shown or discussed may be through some communication interfaces, and the indirect coupling or communication connection of devices or units may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the technical solution of this application in essence or the part that contributes to the prior art or the part of the technical solution can be embodied in the form of a software product, and the computer software product is stored in a storage medium. The storage medium includes several instructions so that a computer (which may be a personal computer, a server, or a network device, etc.) executes all or part of the steps of the methods described in the various embodiments of the present disclosure. The aforementioned storage medium includes: U disk, mobile hard disk drive, Read-Only Memory (ROM), Random Access Memory (RAM), magnetic disks or optical disks and other media that can store program codes.

It should be noted that similar numerals and letters denote similar items in the following drawings, therefore, once an item is defined in one figure, it does not require further definition and explanation in subsequent drawings. In addition, the terms "first", "second", "third", etc. are only used for distinguishing descriptions, and should not be construed as indicating or implying relative importance.

Finally, it should be noted that the above embodiments are only used to illustrate the technical solutions of the present disclosure, but not to limit them; although the present disclosure has been described in detail with reference to the above embodiments, those skilled in the art should understand that, the technical solutions described in the above embodiments can still be modified, or some or all of the technical features thereof can be equivalently replaced; and these modifications or replacements do not make the essence of the corresponding technical solutions deviate from the sprits and scope of the technical solutions of the embodiments of the present disclosure. Therefore, the protection scope of the present application should be based on the attached claims.

The invention claimed is:

1. A method for constructing a virtual firewall based on OpenStack framework, comprising:

modifying a firewall rule of a vector packet processing (VPP) service according to a preset rule, and obtaining a modified VPP service, wherein the modified VPP service utilizes the modified firewall rule to perform data packet control, and the modified VPP service comprises a forwarding stack constructed based on a data plane development kit (DPDK); and replacing the routing service of the OpenStack framework according to the modified VPP service;

wherein the modifying a firewall rule of a vector packet processing (VPP) service according to a preset rule further comprises:

modifying implementation codes of a virtual router in the VPP service to obtain a modified virtual machine, and creating a virtual routing forwarding index for the modified virtual machine;

modifying process codes of an issuing rule of data packet control in the VPP service, and bonding the modified issuing rule with the virtual routing forwarding index; and setting a firewall configuration interface of the VPP service, for bonding a corresponding virtual routing forwarding index, wherein the firewall configuration interface is configured to configure the firewall rule for each virtual routing forwarding index, and the firewall configuration interface comprises determination conditions and processing methods in processing data packets.

2. The method for constructing a virtual firewall based on OpenStack framework according to claim 1, wherein the determination conditions comprise determination parameters and a parameter determination rule, wherein the determination parameters comprise protocol information, port information, and address information, and the parameter determination rule is determined according to an operation command input by a user through the firewall configuration interface.

3. The method for constructing a virtual firewall based on OpenStack framework according to claim 2, wherein the processing methods comprise forwarding or ignoring a forwarding request.

4. The method for constructing a virtual firewall based on OpenStack framework according to claim 1, wherein after replacing the routing service of the OpenStack framework according to the modified VPP service, the method further comprises:

activating the modified VPP service in response to detecting a layer 3 forwarding request, to perform access control on a data packet corresponding to the layer 3 forwarding request.

5. The method for constructing a virtual firewall based on OpenStack framework according to claim 4, wherein the activating the modified VPP service in response to detecting a layer 3 forwarding request, to perform access control on a data packet corresponding to the layer 3 forwarding request comprises:

determining an access target corresponding to the layer 3 forwarding request according to the modified VPP service;

determining the firewall rule according to the virtual routing forwarding index corresponding to the access target;

determining whether the data packet corresponding to the layer 3 forwarding request should be forwarded according to the firewall rule;

forwarding the data packet corresponding to the layer 3 forwarding request to the access target in response to determining that the data packet should be forwarded; and ignoring the data packet corresponding to the layer 3 forwarding request in response to determining that the data packet should not be forwarded.

6. A non-transitory computer-readable storage medium, wherein the computer-readable storage medium stores computer-executable instructions, and the computer-executable instructions, when invoked and executed by a processor, enable the processor to execute operations of:

modifying a firewall rule of a vector packet processing (VPP) service according to a preset rule, and obtaining a modified VPP service, wherein the modified VPP service utilizes the modified firewall rule to perform data packet control, and the modified VPP service comprises a forwarding stack constructed based on a data plane development kit (DPDK); and replacing the routing service of the OpenStack framework according to the modified VPP service;

wherein the modifying a firewall rule of a vector packet processing (VPP) service according to a preset rule further comprises:

modifying implementation codes of a virtual router in the VPP service to obtain a modified virtual machine, and creating a virtual routing forwarding index for the modified virtual machine;

modifying process codes of an issuing rule of data packet control in the VPP service, and bonding the modified issuing rule with the virtual routing forwarding index; and setting a firewall configuration interface of the VPP service, for bonding a corresponding virtual routing forwarding index, wherein the firewall configuration interface is configured to configure the firewall rule for each virtual routing forwarding index, and the firewall configuration interface comprises determination conditions and processing methods in processing data packets.

7. The non-transitory computer-readable storage medium according to claim 6, wherein the determination conditions comprise determination parameters and a parameter determination rule, wherein the determination parameters comprise protocol information, port information, and address information, and the parameter determination rule is determined according to an operation command input by a user through the firewall configuration interface.

8. The non-transitory computer-readable storage medium according to claim 7, wherein the processing methods comprise forwarding or ignoring a forwarding request.

9. The non-transitory computer-readable storage medium according to claim 6, wherein after replacing the routing service of the OpenStack framework according to the modified VPP service, the method further comprises:

activating the modified VPP service in response to detecting a layer 3 forwarding request, to perform access control on a data packet corresponding to the layer 3 forwarding request.

10. A device for constructing a virtual firewall based on OpenStack framework, comprising:

a processor; and a memory for storing a computer program, wherein the processor is configured to run the computer program to perform operations of:

modifying a firewall rule of a vector packet processing (VPP) service according to a preset rule, and obtaining a modified VPP service, wherein the modified VPP service utilizes the modified firewall rule to perform data packet control, and the modified VPP service comprises a forwarding stack constructed based on a data plane development kit (DPDK); and replacing the routing service of the OpenStack framework according to the modified VPP service;

wherein the modifying a firewall rule of a vector packet processing (VPP) service according to a preset rule further comprises:

modifying implementation codes of a virtual router in the VPP service to obtain a modified virtual machine, and creating a virtual routing forwarding index for the modified virtual machine;

modifying process codes of an issuing rule of data packet control in the VPP service, and bonding the modified issuing rule with the virtual routing forwarding index; and setting a firewall configuration interface of the VPP service, for bonding a corresponding virtual routing forwarding index, wherein the firewall configuration interface is configured to configure the firewall rule for each virtual routing forwarding index, and the firewall configuration interface comprises determination conditions and processing methods in processing data packets.

11. The device for constructing a virtual firewall based on OpenStack framework according to claim 10, wherein the determination conditions comprise determination parameters and a parameter determination rule, wherein the determination parameters comprise protocol information, port information, and address information, and the parameter determination rule is determined according to an operation command input by a user through the firewall configuration interface.

12. The device for constructing a virtual firewall based on OpenStack framework according to claim 11, wherein the processing methods comprise forwarding or ignoring a forwarding request.

13. The device for constructing a virtual firewall based on OpenStack framework according to claim 10, wherein after replacing the routing service of the OpenStack framework according to the modified VPP service, the method further comprises:

activating the modified VPP service in response to detecting a layer 3 forwarding request, to perform access control on a data packet corresponding to the layer 3 forwarding request.

14. The device for constructing a virtual firewall based on OpenStack framework according to claim 13, wherein the activating the modified VPP service in response to detecting a layer 3 forwarding request, to perform access control on a data packet corresponding to the layer 3 forwarding request comprises:

determining an access target corresponding to the layer 3 forwarding request according to the modified VPP service;

determining the firewall rule according to the virtual routing forwarding index corresponding to the access target;

determining whether the data packet corresponding to the layer 3 forwarding request should be forwarded according to the firewall rule;

forwarding the data packet corresponding to the layer 3 forwarding request to the access target in response to determining that the data packet should be forwarded; and ignoring the data packet corresponding to the layer 3 forwarding request in response to determining that the data packet should not be forwarded.

* * * * *